United States Patent [19]

Schiel et al.

[11] 4,399,747
[45] Aug. 23, 1983

[54] PRESS ROLL WITH ADJUSTABLE SAG CAPABILITY

[75] Inventors: Christian Schiel, Heidenheim; Robert Wolf, Herbrechtingen, both of Fed. Rep. of Germany

[73] Assignee: J. M. Voith GmbH, Fed. Rep. of Germany

[21] Appl. No.: 281,229

[22] Filed: Jul. 6, 1981

[30] Foreign Application Priority Data

Jul. 8, 1980 [DE]  Fed. Rep. of Germany ....... 3025799

[51] Int. Cl.³ .............................................. B30B 3/04
[52] U.S. Cl. ................................ 100/162 B; 100/170; 29/116 AD
[58] Field of Search ............... 100/162 R, 162 B, 155, 100/170; 29/113 R, 113 AD, 116 R, 116 AD; 72/245

[56] References Cited

U.S. PATENT DOCUMENTS

| | | | |
|---|---|---|---|
| 3,290,897 | 12/1966 | Kuehn | 100/162 B |
| 4,213,232 | 7/1980 | Biondetti et al. | 29/116 AD |
| 4,319,389 | 3/1982 | Marchioro | 29/116 AD |
| 4,327,468 | 5/1982 | Kusters et al. | 29/116 AD |

Primary Examiner—Peter Feldman
Attorney, Agent, or Firm—Ostrolenk, Faber, Gerb & Soffen

[57] ABSTRACT

The invention concerns a press roll having adjustable sag capability, principally for use in paper making machinery, or the like. The press roll includes a hollow, rotatable shell supported by a non-rotatable yoke and hydraulic support elements between the shell and the yoke transfer the press forces from the shell to the yoke. Each end region of the yoke is supported by a stationary support block. The connection between the yoke and the stationary support block is at a particular location. A mating roll cooperating with the press roll is supported by bearings longitudinally positioned approximately at the location of the connection between the support block and the yoke. An additional hydraulic supporting element is defined between the roll shell and the yoke and the longitudinal location of the yoke support piece and the mating roll bearing. The roll shell is supported on a stationary guide element with respect to which the roll shell rotates. The guide element permits the yoke to shift under the pressure, but prevents the yoke from rotating. The length of the roll shell is sufficient to extend into the region where it can be supported by the supporting element. The particular yoke support provided comprises a stationary support block and a tubular cantilever member that extends between the roll shell and the yoke. The yoke bears against the inside of the cantilever member while the roll shell bears against the outside. Packings are provided for sealing the roll shell on the support block. Finally, a planetary gear arrangement located inside the roll shell serves to drive the roll shell to rotate with respect to the yoke.

16 Claims, 3 Drawing Figures

PRESS ROLL WITH ADJUSTABLE SAG CAPABILITY

BACKGROUND OF THE INVENTION

The present invention concerns a press roll, particularly useful in the paper industry, and particularly relates to means for adjusting the press roll against sag.

Press rolls of this kind are known from German Pat. No. 10 26 609 and from German Provisional Patent (Auslegeschrift) No. 22 54 392. The press roll, together with a parallel mating roll, defines a roll press which has a press nip between the two rolls. A web of material which is to be treated is passed though the nip. Such press rolls are used, for instance, at the wet end of paper making machines (in the pulp de-watering presses) or for the glazing of the dried paper, for instance in calenders. Particularly in calenders, extremely precise registry is required between the press roll and the mating roll in order that the thickness of the paper will be uniform over the width of the paper web. If the register between the press and mating rolls is inaccurate, then irregular paper rolls are produced when the web of paper is wound up. These irregular paper rolls are difficult to process further and lead to rejects.

For treating a web of paper in such a roll press, it may be desirable to exert different pressing forces on the marginal regions of the paper web, on the one hand, and on the central region of the web, on the other hand. This may be part of an attempt to eliminate irregularities in the thickness of the paper which may have been caused at other points in the paper making machine or process. Examples of such irregularities include irregular distribution of pulp weight per unit area, unequal moisture content of a dry felt web in the machine and unequal solids content of the paper web in front of a calender.

Known roll presses, including a press roll with adjustable sag and a solid mating roll, have the disadvantage that the desired uniformity in thickness of the treated web of material can frequently still not be obtained. Deviations still occur, which may differ in amount, depending on the value of the pressing force, and these are apparently due to the fact that the distance between the bearings of the mating roller is greater than that distance for the bearings of the shell of the press roll. (See the journal, "Das Papier" 1980, No. 4, pages 125-129). This disadvantage is inherent in all known press roll constructions, regardless of whether the rolls are of the so-called floating support type (German Pat. No. 10 26 609) or of the so-called hydrostatically supported type (German Provisional Pat. No. 22 54 392).

The journal "Das Papier" 1980, No. 5, pages 165-168 and 168-171, says that the irregularities in the thickness of the web can be reduced by means of additional measures. Nevertheless, the basic construction of roll presses has remained unchanged. Thus, it has not heretofore been possible to basically eliminate the causes of paper non-uniformity.

SUMMARY OF THE INVENTION

The object of the present invention is to improve a press roll at the lowest possible cost and in such a manner that optimum uniformity of the thickness of the treated web of material over its width can be obtained. The mobility of the shell of the press roll in the radial direction relative to the internal support shaft inside the shell, i.e., the yoke or beam, is, however, to be retained.

This object is achieved by the press roll of the invention. The press roll comprises the conventional hollow, rotatable roll shell supported by a stationary yoke that extends through the roll shell. The conventional hydraulic or hydrostatic support devices are arrayed along the length of the roll shell to transmit the press force from the roll shell to the yoke along the pressing plane where a press nip is defined between the roll shell and the adjacent mating roll. The yoke is supported at its opposite ends on supporting devices. Inwardly of the supporting devices, there are yoke guide elements each having an opening therethrough through which the yoke passes toward its support. The guide element opening is enlarged along the direction of movement of the yoke under pressure thereupon from the roll shell, but that opening is also shaped to prevent the yoke from rotating as the roll shell yoke rotates.

According to the invention, the roll shell is extended in length, as compared with the known roll shells, and extends up to a part of the support of the press roll yoke. This part of the support is relatively short in length longitudinally of the roll. A support member, which acts between the yoke and the roll shell is provided at the longitudinal location of each of these support parts. The support member comprises a hydraulically operated piston, and movement of the piston adjusts the spacing between the roll shell and the yoke. Depending upon the specific loading, the support member must be arranged so that the force exerted by it acts in the directions either toward or oppositely away from the mating roll. Two of the support members, which act in opposition to each other, can alternatively be provided and either one or the other of those members is used. It is thus possible when operating the press roll, i.e. when it is pressed against the mating roll, to bring about a condition wherein the roll shell of the press roll is supported in the frame and wherein the distance between the roll shell supports is equal to the distance between the bearings of the mating roll. The conventional supporting of the roll shell on the guide elements is retained. These supports are, however, not subjected to load upon operation of the press roll because the support member and the roll shell support take up the pressure.

The invention makes it possible to eliminate the cause of the previously noted irregularities in the thickness of the paper web without the mobility of the shell of the roll in the pressing device being lost. The yoke itself is carried on an appropriate support, ending in stationary support blocks. Each stationary support block may include a tubular cantilever member which extends from the support block laterally into the space between the yoke and the roll shell. On the inside of the cantilever member, the part of the support of the press roll yoke engages the cantilever member. The support member between the yoke and the roll shell engages the exterior of the cantilever member. Instead of the tubular cantilever member, a cantilever pin which engages the inside of the yoke could also be provided.

The difficult problem of the sealing of the inside of the shell of the roll is solved by appropriate packings between the roll shell and the support block for the yoke. In particular, the guide element adjacent the support part for the yoke and through which the yoke passes has an extension bushing that extends outwardly and concentrically to the roll shell. A radial packing ring is provided between is coupled by external toothing thereon into an internally toothed recess in the sun gear for driving that gear to rotate. The planetary gear drive device described can be produced at particularly low expense.

Other objects and features of the invention will be explained below with reference to the accompanying drawings.

DESCRIPTION OF A PREFERRED EMBODIMENT

Figure 1:
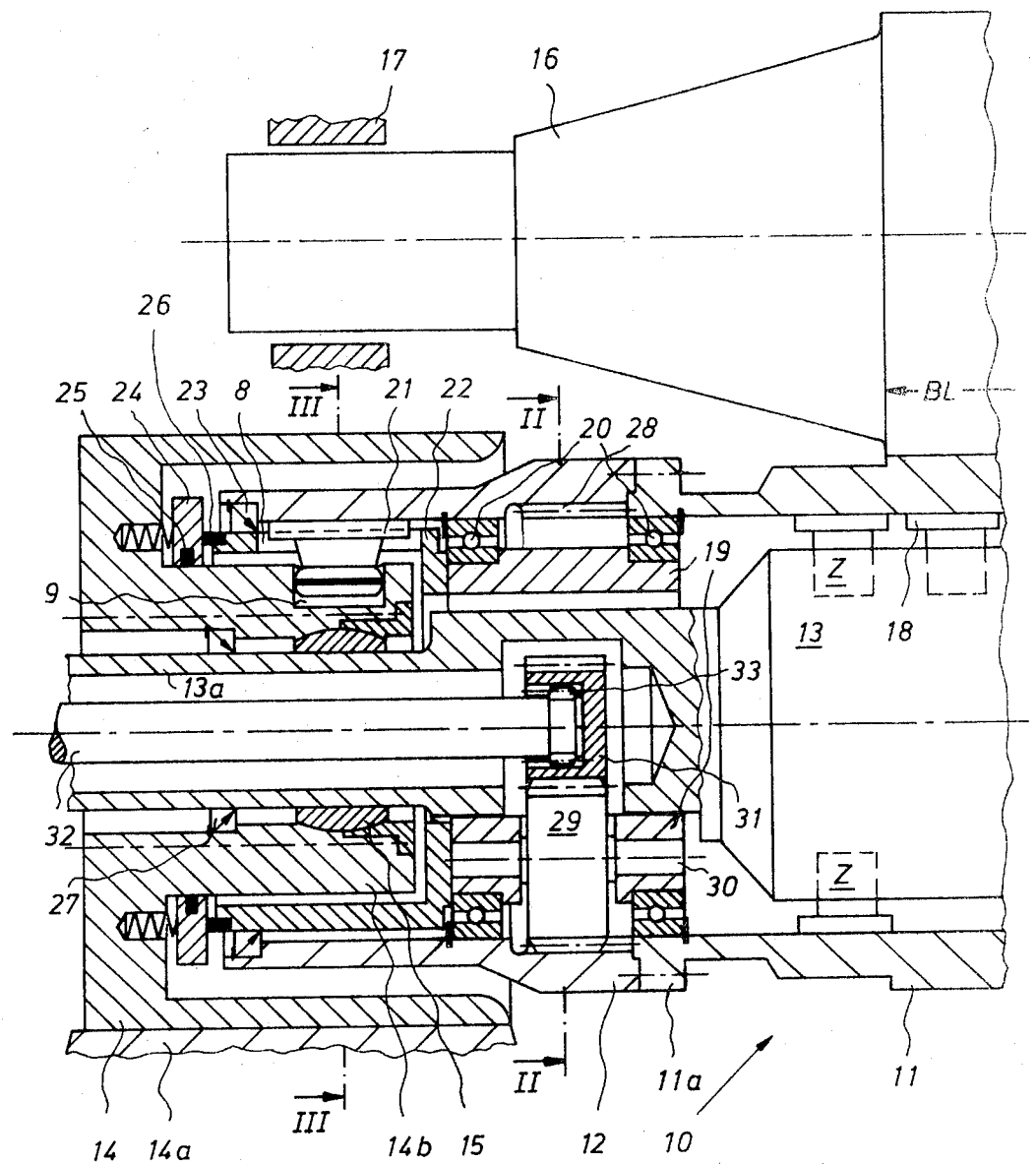
FIG. 1 is a partial longitudinal section through a press roll taken along the line I—I of FIG. 2.

The press roll 10 includes a hollow roll shell 11, which is rotatable about its central longitudinal axis. There is a tubular extension member 12 which extends to the left in FIG. 1 of and is attached to a flange 11a of the roll shell 11. The fixedly positioned, nonrotatable bend support, or yoke or beam 13 extends through the inside of the hollow roll shell 11. The yoke 13 narrows to the hollow end extension 13a inside the roll shell extension member 12.

A stationary support block 14 rests on a machine frame 14a, base plate, or the like. The block 14 has a tubular cantilever member 14b supported inside the block 14 and extending in the axial direction of the roll 10. The cantilever member 14b passes around the yoke 13 at extension 13a and provides the fixed support for the yoke.

A sleeve 15 having a spherically curved outer surface is wrapped about yoke extension 13a. The sleeve 15 is a part of the support block that supports the yoke 13 in the support block 14. The spherically curved outer surface of the sleeve 15 permits the yoke 13 to sag with respect to the the extension bushing and the roll shell. An axial packing ring is provided between the extension bushing and the support block that supports the yoke. The axial packing ring may include a slide surface which is oriented perpendicular to the axis of the roll and which is biased in the axial direction from the support block toward the extension piece.

In accordance with another concept of the invention, an additional supporting element can be arranged longitudinally outside the pressing zone of the shell of the press roll, either in such a manner that it acts in the pressing direction or in opposition thereto.

The line of bend of the shell of the press roll can be controlled in different ways as required, in cooperation with the supporting elements which are arranged in the vicinity of the supports of the yoke. Thus, the pressing forces along the press nip can be set differently as desired. A fundamental advantage of the invention thus becomes clear. Due to the large distance between the supporting elements arranged in the vicinity of the supports for the yoke, it becomes possible to produce a given sag of the surface of the roll with less force than is required in known rolls.

The roll shell is driven to rotate by a planetary gear arrangement. This includes a rotatable drive shaft which is coupled to a sun gear. The sun gear in turn drives at least one and more usually a plurality of planetary gears. The planetary gears, in turn, mesh with the interior of the roll shell to drive the roll shell to rotate. In particular, the interior of the roll shell is toothed to mesh with the teeth of the planetary gears. The planetary gears rotate but are held against movement, in that their axes are supported stationary on the guide element for the yoke, which guide element is coupled to the support block. The planetary gears rotate about their stationary axes. The sun gear rests loosely between the planetary gears. The drive shaft shell 11, 12 and with respect to the member 14b which the sleeve engages.

There is a mating roll 16 which forms a roll press together with the press roll 10. The press roll 10 extends parallel to the mating roll 16 to define a nip between the two rolls. The bearing 17 for the mating roll is shown only diagrammatically. The sleeve 15 for roll 10 and the bearing 17 have at least approximately a common central plane, measured longitudinally of the rolls.

There are hydrostatic support elements 18 for transferring the pressing force from the roll shell 11 to the yoke 13. See U.S. Application No. 123,014, filed Feb. 20, 1980, now U.S. Pat. No. 4,319,390 and U.S. Pat. Nos. 4,064,607; 4,228,571 and 3,932,921. Several such support elements of this type are arranged in known manner in a row along the press nip. Additional support elements Z are arranged between the roll shell and the yoke, but longitudinally outside pressing zone BL. These additional elements also help in adjusting the sag of the yoke 13.

Figure 2:
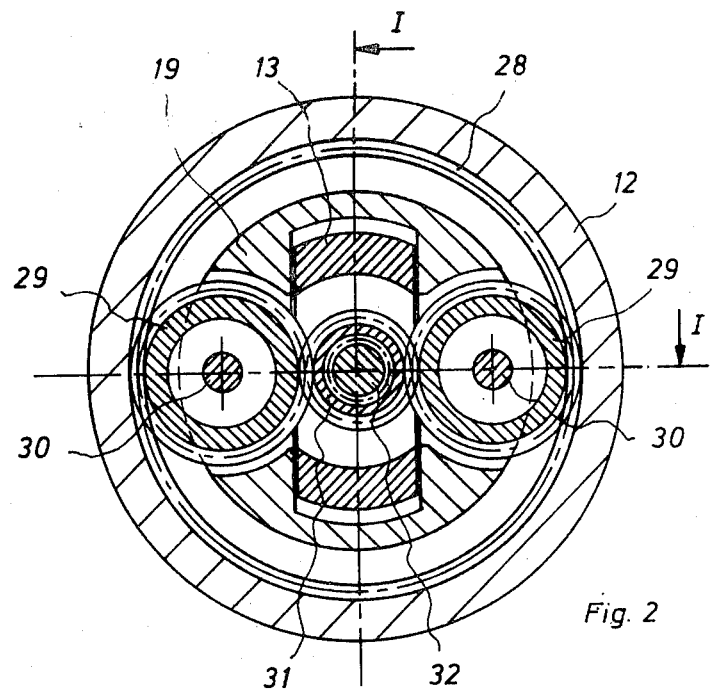
FIG. 2 is a cross-section taken along the line II—II of FIG. 1.

There is an annular roller shell supporting guide element or link 19 which has an internal, longitudinally extending, through recess (FIG. 2). This recess is defined by two surfaces, opposed and parallel to each other and extending along the direction of the pressing force. These surfaces fit against corresponding surfaces of the yoke 13. The link 19 is nonrotatably connected to the yoke, as described below. The link is displaceable vertically relative to the yoke 13, as the yoke sags. The height of the recess in the link allows the movement of the yoke due to sag. Two anti-friction bearings 20 rotatably support the rotatable roll shell 11, 12 on the link or guide element 19.

There is a hydrostatic support element piston 21 having a longitudinal axis that lies at least approximately in the central plane of the bearing 17 of the mating roll 16 and also in the central plane of the sleeve 15. The support piston 21 is displaceable in the direction of the pressing force on roll 10. Displacement of this piston can be accomplished in the same way as with known hydrostatic pistons 18 or otherwise hydraulically, and details of this are not provided here. A pressure space 9 is formed in the supporting block 14 for receiving the end of the piston 21. The curved sides of the piston 21 engage the side walls of the space 9 and the piston 21 can be inclined relative to the supporting block 14. Such inclining will occur upon sagging of the yoke 13. The rear end of the piston 21 lies against the inner surface of the extension member 12 which is fastened to the roll shell 11. Therefore, the piston 21 is between the roll shell 11 and the yoke 13.

Figure 3:
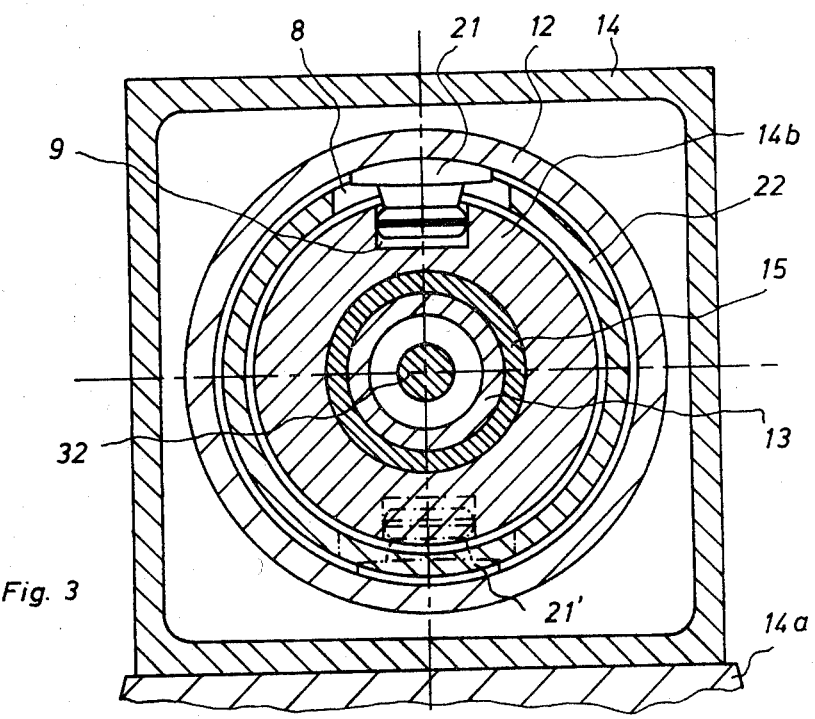
FIG. 3 is a cross-section taken along the line III—III of FIG. 1.

In addition to the support piston 21 shown, an additional support piston that acts in the opposite direction, can be provided, if necessary. This has been indicated at 21' in dot-dash line in FIG. 3.

There is an extension sleeve 22 which is fastened to the guide element or link 19 and is concentric with the roll shell 11, 12, and extends to the (left) end of the shell. The sleeve has a passage opening 8 through it for the support piston 21 to pass through.

Radial packing 23 is placed between the extension member 12 of the roll shell 11 and the extension sleeve 22. There is also a disc 24 displaceable in the axial direction and on the cantilever member 14b. There is packing 25 between the disc 24 and the cantilever member 14b. There is also axial packing 26 between the extension sleeve 22 and the disk 24. Finally, there is packing 27 between the yoke 13 and the support block 14.

A planetary gearing drive is used to rotate the roll shell 11. Internal toothing 28 is developed on the interior surface of the extension piece 12 of the roll shell 11. The extension piece 12 thus forms the internal gear (rack) of planetary gearing. Two planetary gears 29 are provided, having respective axes of rotation that lie in a plane which is perpendicular to the direction of the pressing force at the roll nip. Pins 30 are supported in the link 19 and define the axes of the planetary gears 29, which are rotatably supported on the pins 30. The link 19 is thus the planetary gear carrier. As the link is held stationary, the planetary gears rotate while also remaining stationary. The sun gear 31 is externally toothed to mesh with the teeth of the planetary gears. The sun gear also has internal toothing for defining a tooth coupling with the drive shaft 32. The drive shaft 32 is rotated by drive means (not shown) for rotating the shell 11, 12. The shaft 32 has a toothed coupling 33 defined on its tip for engaging the internal toothing in the sun gear 31, for rotating the sun gear. The toothed coupling 33 is short enough axially that it permits inclination of the drive shaft 32 relative to the sun gear 31. In the usual planetary gearing operation, rotation of shaft 32 drives the shell 11, 12 to rotate.

At its outer end (not shown), the drive shaft 32 is mounted by means of a self-aligning bearing in the outer end of the extension 13a of the yoke 13 and is connected there to drive elements (not shown) by another articulated coupling.

Only the drive-side end of the press roll of the invention has been shown. The other end (not shown) of the press roll is developed in corresponding fashion but without the drive parts 28–33.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A press roll with adjustable sag capability, comprising:
    a hollow rotatable roll shell; a relatively nonrotatable yoke extending through the hollow roll shell; support means between the roll shell and the yoke for transmitting press force from the roll shell to the yoke in a pressing plane extending longitudinally along the roll shell;
    the roll shell having ends and end regions near the ends thereof, and at each end region of the roll shell:
    the yoke having a nonrotatable support including a part directly supporting the yoke;
    a shell guide element being arranged generally alongside the yoke support part and also being connected to the yoke to prevent relative rotation between the guide element and the yoke, but the yoke also being supported to be displaceable along the direction of pressing force, with respect to the guide element; the guide element being nonrotatable with respect to the support;
    the roll shell being supported on the shell guide element which allows movement of the roll shell along the direction of pressing force, but the roll shell being rotatable with respect to the guide element;
    the roll shell being of a longitudinal length to extend to the longitudinal region where the yoke support part is located;
    a supporting element being provided generally at the longitudinal location of the yoke support part, for supporting the roll shell against the yoke, and the supporting element being displaceable relative to the yoke in the pressing plane.

2. The press roll of claim 1, wherein the support means between the roll shell and the yoke are hydraulically operable.

3. The press roll of claim 1, wherein the yoke support part that engages the yoke is generally of a short longitudinal length; the supporting element has an axis that is generally along a radius of the roll, and the supporting element axis lies generally in the longitudinal center of the part of the yoke support.

4. In combination, the press roll of either of claims 1 or 3, and a mating roll which is oriented with respect to the press roll to define a press nip between the rolls, which press nip is in the press plane;
    the two supporting elements at the end regions of the roll shell being spaced apart a predetermined distance;
    the mating roll having ends and end regions near the ends thereof and the mating roll being supported at the end regions thereof by bearings which are spaced apart a distance such that the predetermined distance of spacing of the supporting elements of the press roll is at least approximately the distance between the bearings of the mating roll.

5. The combination of claim 4, wherein the yoke support at each end of the press roll comprises: a stationary support block having a tubular cantilever member which extends into the space between the yoke and the roll shell; the tubular cantilever member having an inside and an outside; the yoke support part bearing against the inside of the cantilever member; and the supporting element bearing against the outside of the cantilever member.

6. The combination of claim 4, further comprising an additional support element between the press roll shell and the yoke, and the additional support element being located longitudinally outside the press nip; the additional support element also being displaceable relative to the yoke along the direction of pressing force upon the press roll.

7. The press roll of claim 1, wherein the yoke support comprises: a stationary support block having a tubular cantilever member which extends into the space between the yoke and the roll shell; the tubular cantilever member having an inside and an outside; the yoke support part bearing against the inside of the cantilever member and the supporting element bearing against the outside of the cantilever member.

8. The press roll of claim 7, wherein the support part includes a curvedly shaped surface which engages the support block, whereby the support part and block may continue to engage during yoke sag.

9. The press roll of claim 7, wherein at the end of the roll shell, a packing between the roll shell and the support block is provided, the packing comprising:
- an extension bushing on the guide element extending concentrically to and longitudinally out to the end of the roll shell, and the extension bushing including an opening thereacross for permitting passage therethrough of the supporting element;
- a radial packing ring being positioned between the extension bushing and the roll shell; and
- an axial packing ring being positioned between the extension bushing and the support block.

10. The press roll of claim 9, wherein the axial packing ring comprises a disc including a slide surface which is oriented perpendicular to the axis of the roll; biasing means for urging the slide surface from the support block against the extension bushing.

11. The press roll of claim 1, wherein the supporting element is hydraulically operable.

12. The press roll of claim 1, wherein the supporting element is located in the pressing plane at the side of the press roll which engages the mating roll.

13. The press roll of any of claims 1, 11 and 12, further comprising a second one of the supporting elements located diametrically opposite the first of the supporting elements.

14. The press roll of claim 1, further comprising drive means for driving the roll shell to rotate with respect to the yoke, the drive means comprising:
- the roll shell being internally gear toothed;
- a planetary gear supported against movement on the guide element and being rotatable with respect to the guide element, the planetary gear being supported for rotation on an axis at least approximately perpendicular to the direction of pressing force; the planetary gear being toothed for engaging the toothed roll shell;
- a toothed sun gear drivingly connected with the planetary gear and held against moving with respect to the press roll but being rotatable with respect to the press roll;
- a drive shaft connected with the sun gear for rotating the sun gear.

15. The press roll of claim 14, wherein the sun gear has a toothed opening for receiving the drive shaft therein, and the drive shaft is toothed for engaging the toothed opening of the sun gear;
- the yoke having a recess therein for receiving the sun gear and through which the drive shaft extends.

16. The press roll of either of claims 14 or 15, wherein there are two of the planetary gears, each engaging the sun gear and together supporting the sun gear in cooperation with the drive shaft.

* * * * *